US012802516B2

(12) United States Patent
Hilbert et al.

(10) Patent No.: US 12,802,516 B2
(45) Date of Patent: Nov. 17, 2026

(54) GAMING TABLE TOKEN SENSING APPARATUS AND RELATED SYSTEMS AND METHOD

(71) Applicant: LNW Gaming, Inc., Las Vegas, NV (US)

(72) Inventors: Scott Hilbert, Sparks, NV (US); Joseph R. Hedrick, Reno, NV (US); Frank A. Scarpa, Jr., Henderson, NV (US); Matt Moses, Las Vegas, NV (US); Collin Patrick Moore, Henderson, NV (US); Miguel A. Vega, Chicago, IL (US); Dhaval Shah, Itasca, IL (US); Matthew J. Lucchetti, Las Vegas, NV (US); Kristofer Pizer, Hickory, PA (US)

(73) Assignee: LNW Gaming, Inc., Las Vegas, NV (US)

( * ) Notice: Subject to any disclaimer, the term of this patent is extended or adjusted under 35 U.S.C. 154(b) by 149 days.

(21) Appl. No.: 18/780,863

(22) Filed: Jul. 23, 2024

(65) Prior Publication Data

US 2025/0037534 A1 Jan. 30, 2025

Related U.S. Application Data

(60) Provisional application No. 63/516,201, filed on Jul. 28, 2023.

(51) Int. Cl.
*G07F 17/32* (2006.01)
*G01S 17/04* (2020.01)

(52) U.S. Cl.
CPC .......... *G07F 17/3211* (2013.01); *G01S 17/04* (2020.01)

(58) Field of Classification Search
CPC .......................... G07F 17/322; G07F 17/3209
See application file for complete search history.

(56) References Cited

U.S. PATENT DOCUMENTS 4,760,527 A * 7/1988 Sidley .................... A63F 13/30 463/13
4,814,589 A * 3/1989 Storch ................... G06K 19/04 211/49.1

(Continued)

OTHER PUBLICATIONS

U.S. Patent and Trademark Office, Non-Final Office Action mailed Mar. 25, 2026, in U.S. Appl. No. 19/088,412 to Hilbert et al., 14 pages.

(Continued)

*Primary Examiner* — David Duffy

(57) ABSTRACT

A token sensor for a gaming table and a related system and method are provided. In a typical configuration, multiple token sensors are positioned at respective locations of a game layout installed above a cushioning layer of the gaming table that covers a top of the gaming table. Top surfaces of the token sensors lie flush with or slightly above the top surface of the game layout. Each token sensor includes a plurality of paired light radiation emitters and light radiation detectors. When none of the detectors receive light from their paired emitter, the presence of a token is indicated. Such planar detection of the presence of a token allows the upper surface of the sensor to be used for other purposes when presence of a token is not expected. Each token sensor may thus include a touchscreen display for the issuance and acceptance of game information and commands.

16 Claims, 15 Drawing Sheets

(56) References Cited

U.S. PATENT DOCUMENTS

| | | | | | |
|---|---|---|---|---|---|
| 5,586,936 | A * | 12/1996 | Bennett | G07F 17/32 | 463/25 |
| 5,605,334 | A * | 2/1997 | McCrea, Jr. | G07F 17/3293 | 273/309 |
| 5,651,548 | A * | 7/1997 | French | G07F 1/06 | 273/237 |
| 5,909,876 | A * | 6/1999 | Brown | A63F 3/00157 | 273/309 |
| 5,919,090 | A * | 7/1999 | Mothwurf | G07F 17/32 | 463/25 |
| 6,165,069 | A * | 12/2000 | Sines | G07F 17/3216 | 273/274 |
| 6,267,671 | B1 * | 7/2001 | Hogan | G06Q 30/02 | 463/25 |
| 6,514,140 | B1 * | 2/2003 | Storch | G07F 17/3255 | 463/13 |
| 6,659,461 | B2 | 12/2003 | Yoseloff et al. | | |
| 6,688,979 | B2 * | 2/2004 | Soltys | G07F 17/32 | 348/135 |
| 7,367,884 | B2 * | 5/2008 | Breeding | G07F 17/32 | 273/274 |
| 7,771,272 | B2 * | 8/2010 | Soltys | A63F 3/00157 | 463/25 |
| 8,342,956 | B2 | 1/2013 | Anderson | | |
| 8,348,749 | B1 * | 1/2013 | Ungaro | G07F 17/3206 | 463/30 |
| 8,512,135 | B2 | 8/2013 | Anderson et al. | | |
| 8,545,321 | B2 * | 10/2013 | Baerlocher | G07F 17/322 | 463/37 |
| 8,550,911 | B2 | 10/2013 | Sylla | | |
| 8,616,962 | B2 | 12/2013 | Anderson et al. | | |
| 8,834,254 | B2 | 9/2014 | Buchholz et al. | | |
| 9,142,084 | B2 | 9/2015 | Kelly et al. | | |
| 9,396,610 | B2 | 7/2016 | Aoki et al. | | |
| 9,478,099 | B2 * | 10/2016 | Czyzewski | G07F 17/322 | |
| 9,536,389 | B2 | 1/2017 | Helgesen et al. | | |
| 9,613,488 | B2 | 4/2017 | Kelly et al. | | |
| 9,940,776 | B2 | 4/2018 | Czyzewski et al. | | |
| 10,134,223 | B2 | 11/2018 | Mandava et al. | | |
| 10,290,178 | B2 | 5/2019 | Czyzewski et al. | | |
| 10,311,673 | B2 | 6/2019 | Helgesen et al. | | |
| 10,339,755 | B2 | 7/2019 | Snow | | |
| 10,395,470 | B2 | 8/2019 | Czyzewski et al. | | |
| 10,699,521 | B2 | 6/2020 | Czyzewski et al. | | |
| 10,726,669 | B2 | 7/2020 | Kelly et al. | | |
| 10,909,815 | B2 | 2/2021 | Donadio | | |
| 11,024,114 | B2 | 6/2021 | Kroupp et al. | | |
| 11,335,165 | B2 | 5/2022 | Kelly et al. | | |
| 11,373,479 | B2 | 6/2022 | Czyzewski et al. | | |
| 2006/0177109 | A1 * | 8/2006 | Storch | A63F 1/00 | 382/118 |
| 2007/0002013 | A1 | 1/2007 | Kong et al. | | |
| 2007/0045958 | A1 * | 3/2007 | Rader | G07F 17/32 | 273/274 |
| 2009/0121431 | A1 * | 5/2009 | Rader | G07F 17/3211 | 273/274 |
| 2014/0200071 | A1 * | 7/2014 | Czyzewski | G07F 17/3288 | 463/25 |
| 2014/0295948 | A1 * | 10/2014 | Helgesen | G07F 17/322 | 463/25 |
| 2015/0356810 | A1 * | 12/2015 | Kelly | G07F 17/3251 | 29/428 |
| 2021/0090380 | A1 | 3/2021 | Abrahamson et al. | | |
| 2021/0287480 | A1 | 9/2021 | Kroupp et al. | | |
| 2023/0245529 | A1 | 8/2023 | Maya | | |

OTHER PUBLICATIONS

Applicant's Response to Non-Final Office Action filed Jun. 2, 2026, in U.S. Appl. No. 19/088,412 to Hilbert et al., 6 pages.

U.S. Patent and Trademark Office, Non-Final Office Action mailed Mar. 26, 2026, in U.S. Appl. No. 19/205,239 to Hilbert et al., 14 pages.

Applicant's Response to Non-Final Office Action filed Jun. 2, 2026, in U.S. Appl. No. 19/205,239 to Hilbert et al., 10 pages.

* cited by examiner

GAMING TABLE TOKEN SENSING APPARATUS AND RELATED SYSTEMS AND METHOD

CROSS-REFERENCE TO RELATED APPLICATION(S)

This patent application claims priority benefit of U.S. Provisional Patent Application No. 63/516,201 filed Jul. 28, 2023. The disclosure of the 63/516,201 Application is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023-2024, LNW Gaming, Inc.

FIELD OF THE INVENTION

The present invention relates to the field of table gaming, wagering methods and apparatus on gaming tables, and automated recognition of wagers on gaming tables.

BACKGROUND OF THE INVENTION

In casino table games, wagering was originally done (and in many circumstances is still done) exclusively by the physical placement of money, currency, coins, tokens or chips on the gaming table and allowing the wager to remain on the gaming table until conclusion of the game and resolution of the wager(s). The placement of physical wagers on tables allows for some players to attempt to commit fraud on casinos by late placement of wagers, alteration of wagers and particularly placement of side bet wagers, bonus wagers and jackpot wagers.

Side bets, bonus and jackpot payouts can reach levels of hundreds of thousands of dollars at gaming tables and the temptation to commit fraud at a table increases. Similarly, the casinos need to prevent fraud increases to assure the game is fair to players. With the linkage of games (e.g., different games) within a casino or among different casinos, a uniform standard of control is needed that assures equal avoidance and prevention of cheating at all tables and at all facilities.

In the past twenty years, numerous systems have been provided or disclosed for the automated recognition of wagers, including side bet, bonus and jackpot wagers. Among the disclosures of these types of technologies include U.S. Pat. No. 5,794,964 (Jones) in which a sensor detects when a gaming token is dropped into a slot on the gaming table and a coin acceptor is mounted to detect the passage of a gaming token through the slot.

U.S. Pat. Nos. 5,544,892, 6,299,534 and 7,367,884 (Breeding) discloses an apparatus for detecting the presence of a gaming token. This apparatus has at least one predetermined location for receiving a gaming token on a gaming table. At each predetermined location for receiving a gaming token designated on the gaming table, a proximity sensor is mounted to the gaming table such that each sensor is aligned with one predetermined location. A decoder is electrically connected to each proximity sensor for determining whether a gaming token is present at each predetermined location.

When the presence of a gaming token is sensed by the decoder, the player's bet is registered by transmission of the sensed presence to a processor. Each sensor in these systems has a connection to a processor (e.g., game processor or system processor) where the individual wagers are recorded and identified. In a preferred embodiment, there is a backlight under the predetermined location that lights up when a wager is made at that location that remains lit when the processor identifies acceptance and recognition of the wager during each game or round of play at the gaming table.

SUMMARY OF THE INVENTION

A token sensor for a gaming table and a related system and method are provided. In a typical configuration, multiple token sensors are positioned at respective locations of a game layout installed above a cushioning layer of the gaming table that covers a support surface (top) of the gaming table. Top surfaces of the token sensors lie flush with or slightly above the top surface of the game layout. Each token sensor includes a plurality of paired light radiation emitters and light radiation detectors. When none of the detectors receive light from their paired emitter, the presence of a token is indicated. Such planar detection of the presence of a token allows the upper surface of the sensor to be used for other purposes when presence of a token is not expected. In accordance with some embodiments, each token sensor may thus include a touchscreen display for the issuance and acceptance of game information and commands.

A plurality of gaming tables may be connected together as a system. This system may be used to link progressive proprietary table games such as the CARIBBEAN STUD® poker game, the THREE CARD POKER PROGRESSIVE® poker game, the PROGRESSIVE TEXAS HOLD'EM™ poker game and a similar variety of blackjack, pai gow poker and baccarat games. Examples of systems which link multiple table games with token sensors are disclosed in U.S. Pat. Nos. 5,393,067 and 4,861,041. The present system can include multiple gaming tables each with a dealer terminal connected to a server such as the commercially available a GM Atlas system sold by Light and Wonder, Inc.

Additional aspects of the invention will be apparent to those of ordinary skill in the art in view of the detailed description of various embodiments, which is made with reference to the drawings, a brief description of which is provided below.

Figure 1:
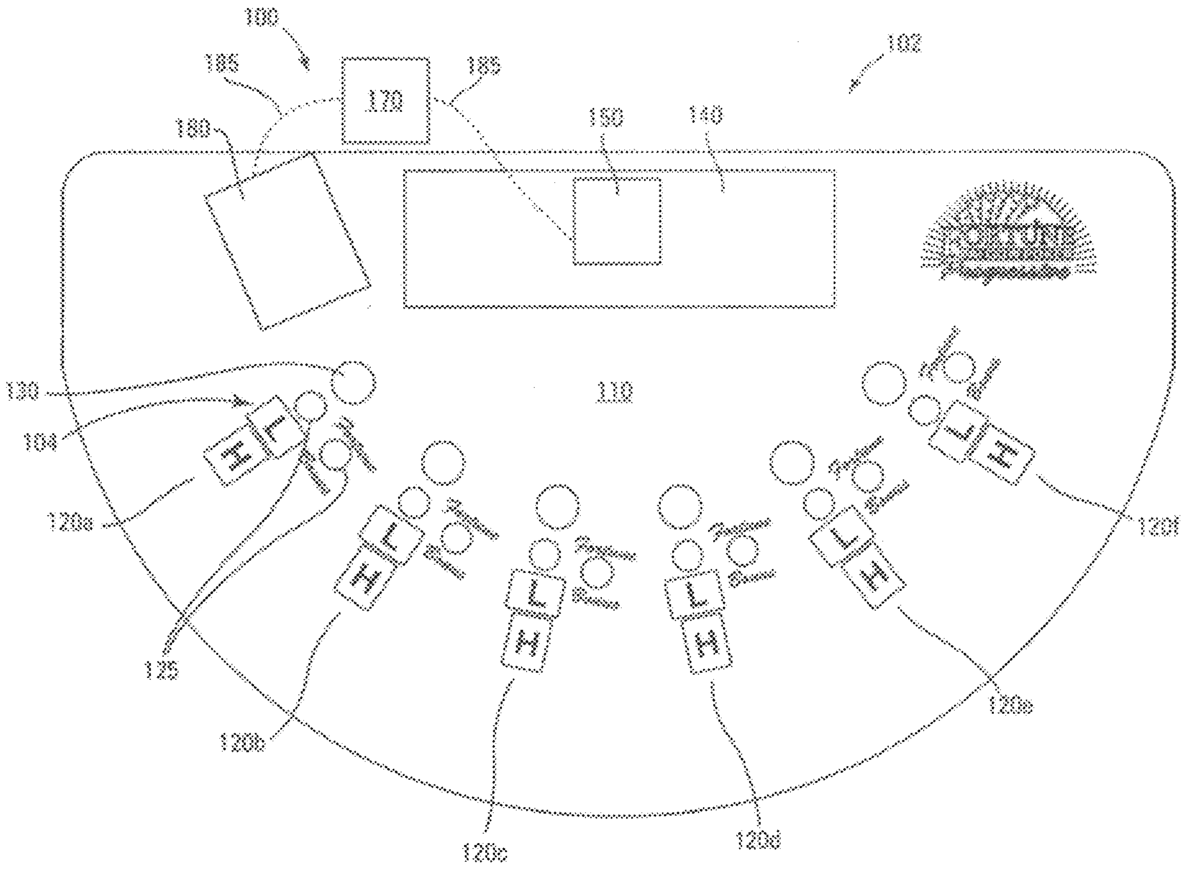
FIG. 1 is a top plan view of an exemplary gaming table apparatus with an integrated wager sensing system including a plurality of token bet sensors.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and herein described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." The terms "light radiation" and "light" mean "light radiation."

Reference to the figures will further assist in an appreciation of the present technology. FIG. 1 is an exemplary gaming table 102 with a wager sensing system 100. Preferably the wager sensing system 100 senses progressive jackpot wagers. Other examples of the invention sense primary bets, other types of side bets and combinations thereof. The wager sensing system 100 may be used for a progressive jackpot system such as the system disclosed in U.S. Pat. No. 5,794,964 (Jones) or in any other bonus or side bet feature system. According to the invention, the gaming table 102 has a gaming table layout 110, preferably a felt surface with indicia thereon identifying elements 104 of the game, such as wager positions and odds. A chip tray 140 is disposed opposite a plurality of player positions 120 (120*a*-120*f*). Preferably, chip tray 140 includes an integrated dealer input and display 150 which is part of the dealer terminal. The system further includes game controller 170 electrically connected to the integrated dealer input and display 150 by system wiring 185. Preferably, the system also includes card handling device 180, such as a shoe or a shuffler, which is also electrically connected to game controller 170 by system wiring 185. It is further preferred that the shoe or shuffler contain card reading functionality so that cards stored, delivered or withheld have at least one of suit and rank read and that information processed as desired, as disclosed for example in U.S. Pat. Nos. 7,769,232; 7,766,332; 7,764,836; 7,717,427; 7,677,565; 7,593,544; and 7,407,438.

Each player position 120 includes wagers areas 125 and a bonus bet area, which comprises a token sensor assembly 130. The preferred embodiment will allow one token sensor assembly for each player position 120, which player positions will number six or seven on a standard gaming table for games like TEXAS HOLD'EM BONUS® poker, THREE CARD POKER® and Pai Gow Poker. Systems with parallel connections between token sensors 130 and processors are preferred over serial daisy-chained connections because failure of a single token sensor 130 will not prevent use of the remaining token sensors 130 in operation. While, in this example, each token sensor 130 is used for sensing only a bonus game or progressive wager, it is understood that token sensors could be used for any and all wager areas without deviating from the scope of the invention.

Since all player positions 120 are essentially the same, only position 120*a*, and in particular, the token sensor 130 at position 120*a*, will be described in detail. The game controller 170 provides instructions to the token sensor 130, such as instructions to begin a new round of game play or data to display on a display incorporated into each token sensor. Upon receiving these instructions, the token sensor 130 presents any display information and/or determines a presence of any particular wager, especially a progressive wager, a side bet wager, optional or mandatory bonus wager and the like.

The token sensors in prior art reference U.S. Pat. No. 7,367,884, used a modulated light sensor mounted into a machined enclosure or flanged "can," which, in turn, is flush-mounted into the gaming table surface. The sensor detects a token, or chip, placed on top of a lens above the sensor. Thus, historically, token sensors 130 have used "vertical" sensing, where a beam of energy "light" is emitted upward and if a token is placed on the sensor, the reflected light back to a detector within the token sensor registers the token's presence. These token sensors have limitations in detection as they require calibration for the token set based the color and material makeup of the token. When the light source in those sensors hits a "black spot" on the token (a high optical density dark spot, such as black marking), the token presence may not be sensed. A misread could also result from light reflecting off the inside of the sensor cover, or in some cases even ambient light "bleeding through" the cover to the receiver. Another limitation is that the detector must be centrally located in the token sensor 130. This limitation does not allow the center of the token sensor to be used for any other purpose, such as lighting or display of information. In contrast, in the embodiments disclosed herein, a "planar" token detection scheme that can be used over a display or otherwise fully illuminated surface is now described.

Figure 2A:
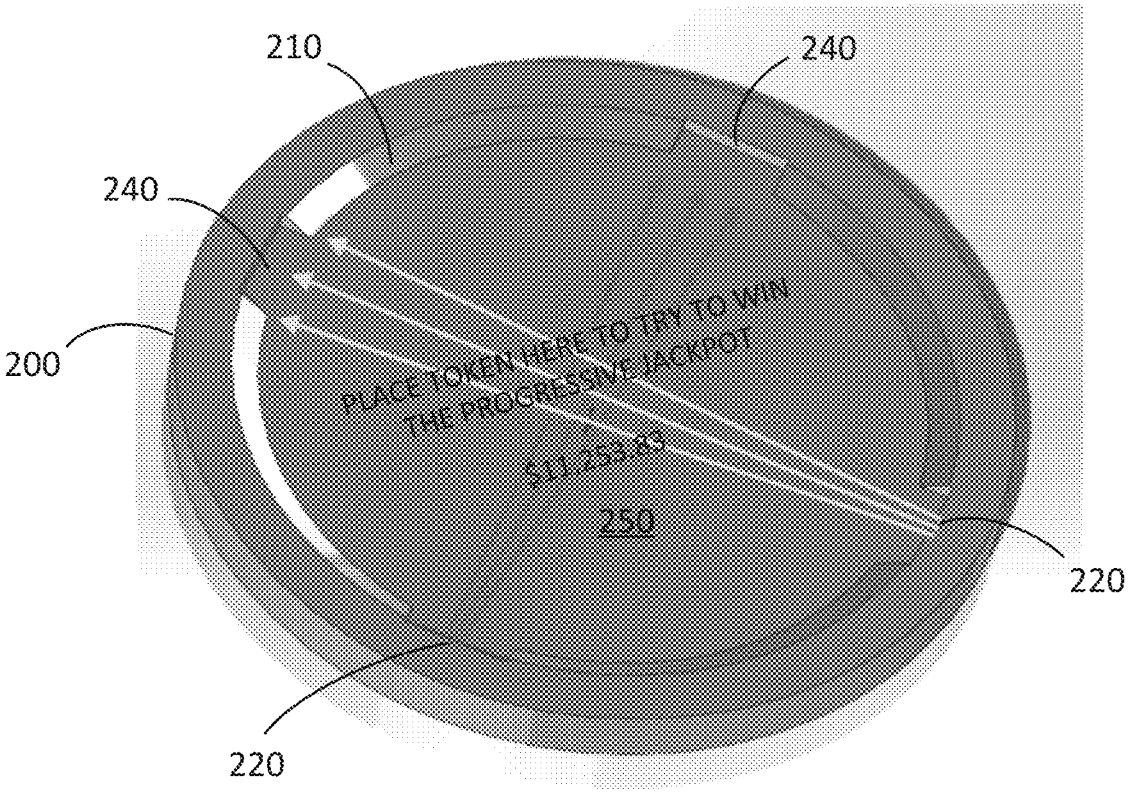
FIG. 2A is a top perspective view of an exemplary token sensor assembly in accordance with one or more embodiments.

FIG. 2A broadly illustrate this planar token detection concept when no token rests atop the token sensor 200, which is akin to the token sensor 130 of FIG. 1. A plurality of light emitters 220 project light horizontally through a bezel 210 above the top surface 250 of the token sensor 200, which is akin to token sensor 130 of FIG. 1. A plurality of light detectors 240 are diametrically paired with each of the plurality of light emitters 210. When the light detectors 240 all receive light from their respective emitters 220, it is assumed that no object, such as a token, rests on the upper surface 250 of the token sensor 200 to interrupt the transmitted light.

Advantageously over the prior art, the upper surface 250 of the token sensor 200 includes an electronic display device, which may be used to present dynamic text and graphics which may include attract animations, celebratory animations, instructions or the like. These instructions, for example, may include the current amount of a progressive jackpot, as shown, or to announce "No More Bets" once wagering is no longer available at the start of a game round. The electronic display device may include a touchscreen. In alternate embodiments, the token sensor does not include a display. In these embodiments, fixed graphics or instructions may be screen printed or otherwise displayed on an opaque plate of the same dimensions as the illustrated electronic display.

Figure 2B:
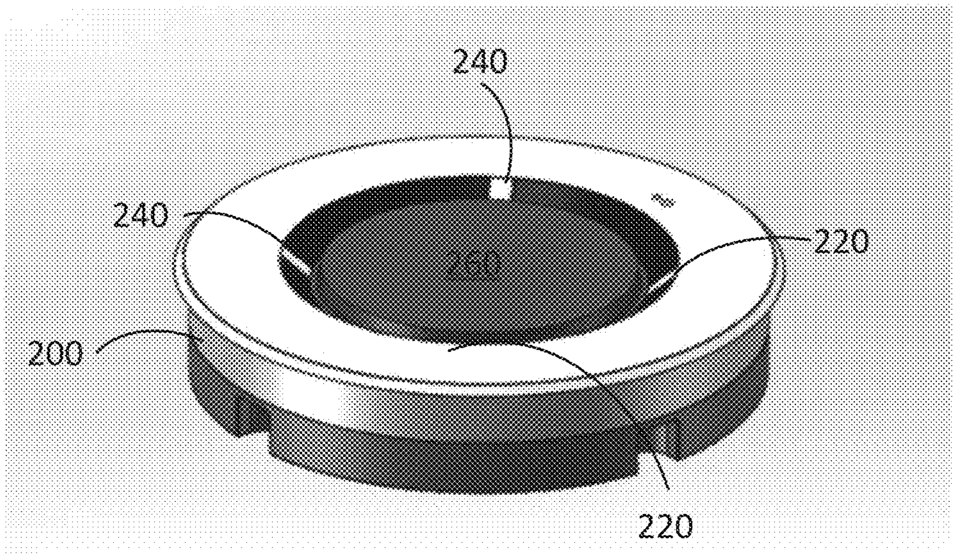
FIG. 2B is a side isometric view of the exemplary token sensor assembly with a token in place on the assembly in accordance with one or more embodiments.

FIG. 2B broadly illustrates when a token 260, such as a coin or casino chip, rests atop and covers substantially all of the upper surface 250 of the token sensor 200, blocking the beams of light from the emitters 220 from being received by their paired detectors 240.

Figure 2C:
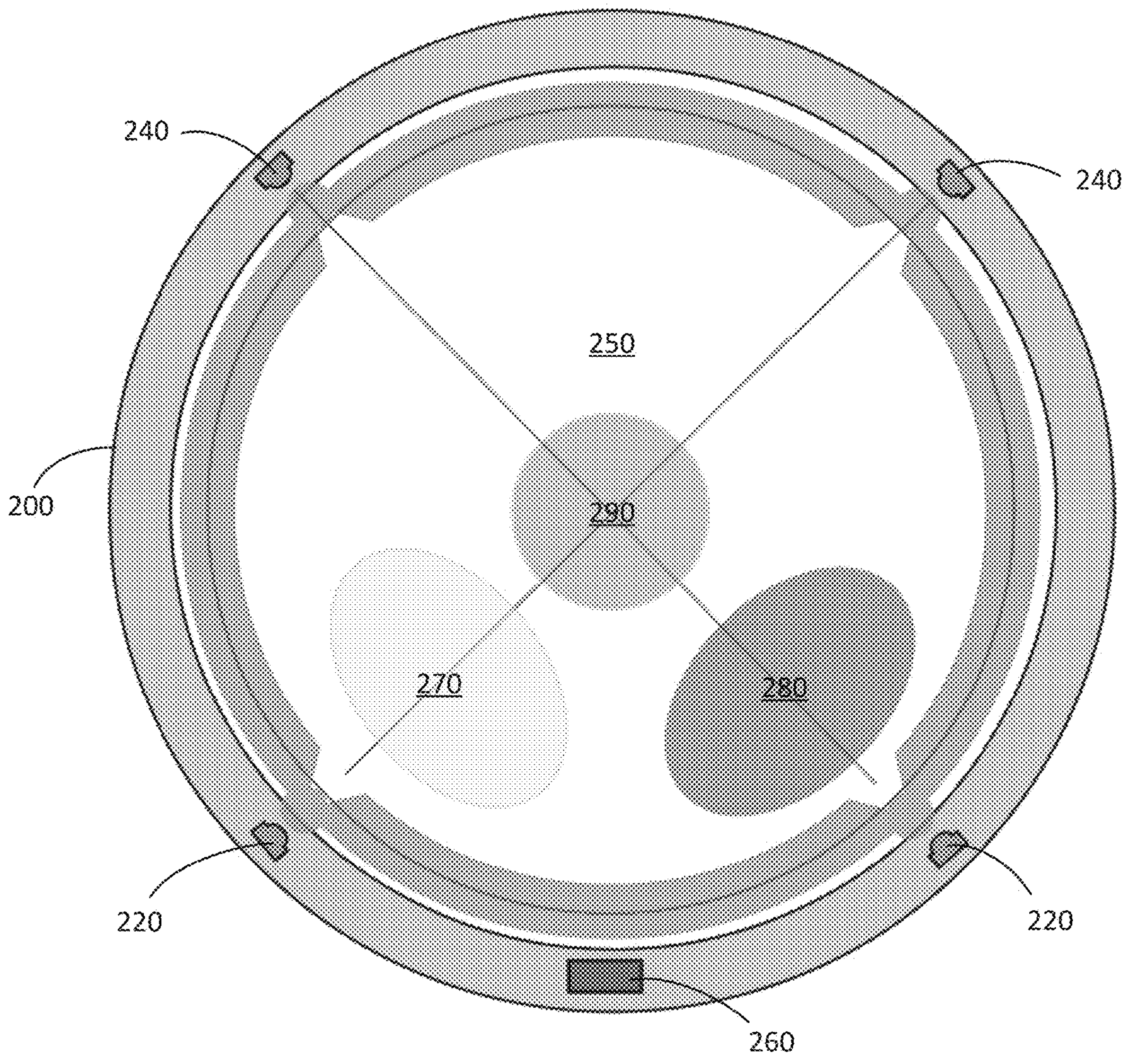
FIG. 2C is a top view of the exemplary token sensor assembly illustrating touch zones in accordance with one or more embodiments.

FIG. 2C illustrates that, when no token is present, the upper surface 250 of the token sensor 200 may be used as a player input device when the game controller 170 is not expecting a token 260 on the upper surface 250 of the token sensor 200. Instead, the game controller 170 may interpret the blockage of light signals as input signals to the game controller from the dealer or, more particularly, from a player. The game controller 170 may display instructions and identify touch zones or images of buttons on the display electronic display device. Depending on which beams of light from the emitters 220 are blocked from being received by the sensors, individual touch zones 270, 280, 290 are created. A player's fingertip, for example, pressed against the middle of the upper surface 250, for example, would block both beams of light, signifying a touch in the middle touch zone 290. In more complex scenarios, the game controller 170 may instruct the player to "swipe" across the top surface, the swipe being detected as successive touches in each of the zones 270, 280, 290.

FIG. 2C also illustrates that the token sensor 200 may include an upward facing gesture sensor 260. Unlike the above-mentioned touchscreen and touch zones 270, 280, 290, which require physical contact with the token sensor 200, the token sensor 200 may also provide input information to the game controller 170 if an object, such as a player's hand, simply passes above the gesture sensor 260. For example, the game controller 170 may display instructions on the electronic display device such as, "Wave your hand over this message to spin a bonus wheel!" The game controller 170, via control logic circuitry in the token sensor 200, would then monitor the gesture sensor for an initial negative input, a positive input as the player's hand passes over the gesture sensor 260 and a final negative input that indicates that the player's hand is no longer over the token sensor 200. An exemplar case study of a game employing the display, token detection and player input capabilities of various embodiments will be presented below.

The various components of the token sensor 200 will now be described in greater detail with reference to additional figures.

Figure 3A:
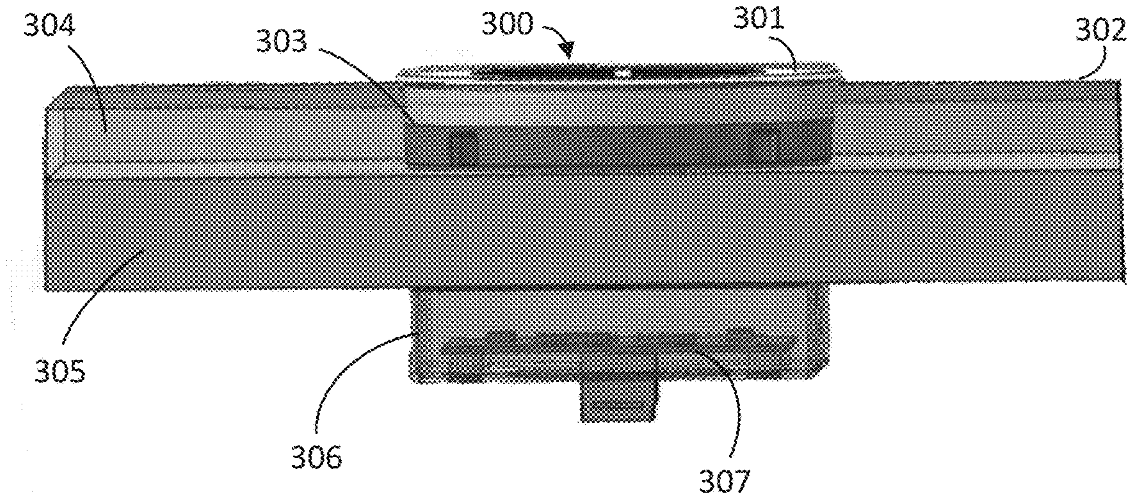
FIG. 3A is a side cross-sectional view of the exemplary token sensor assembly mounted to a gaming table in accordance with one or more embodiments.

Referring FIG. 3A, a single token sensor 300 (akin to token sensors 130 and 200, above) includes a number of sub-assemblies. The token sensor 300 includes an upper "puck" assembly 303 with an upper surface 301 for receiving a token. The upper surface 301 may be a screen of an electronic display device. The upper upper surface 301 lies flush with or slightly (1-2 mm) above the top surface of the gaming table's game layout 302. The puck assembly 303 extends through holes in the game layout 302 and a cushioning layer 304 down to a mount (not shown here, but described further below with reference to FIG. 3C) attached to the top of the support surface 305. The mount includes a center hole aligned with a hole in the support surface 305 which allows wiring connections to be made to one or more additional modules attached to the bottom of, or otherwise positioned beneath, the bottom of the support surface 305. As illustrated, these additional module(s) may contain support circuitry such as a control printed circuit board ("control PCB") 307 contained in a lower bracket 306 attached to the lower surface of the support surface 305.

Figure 3B:
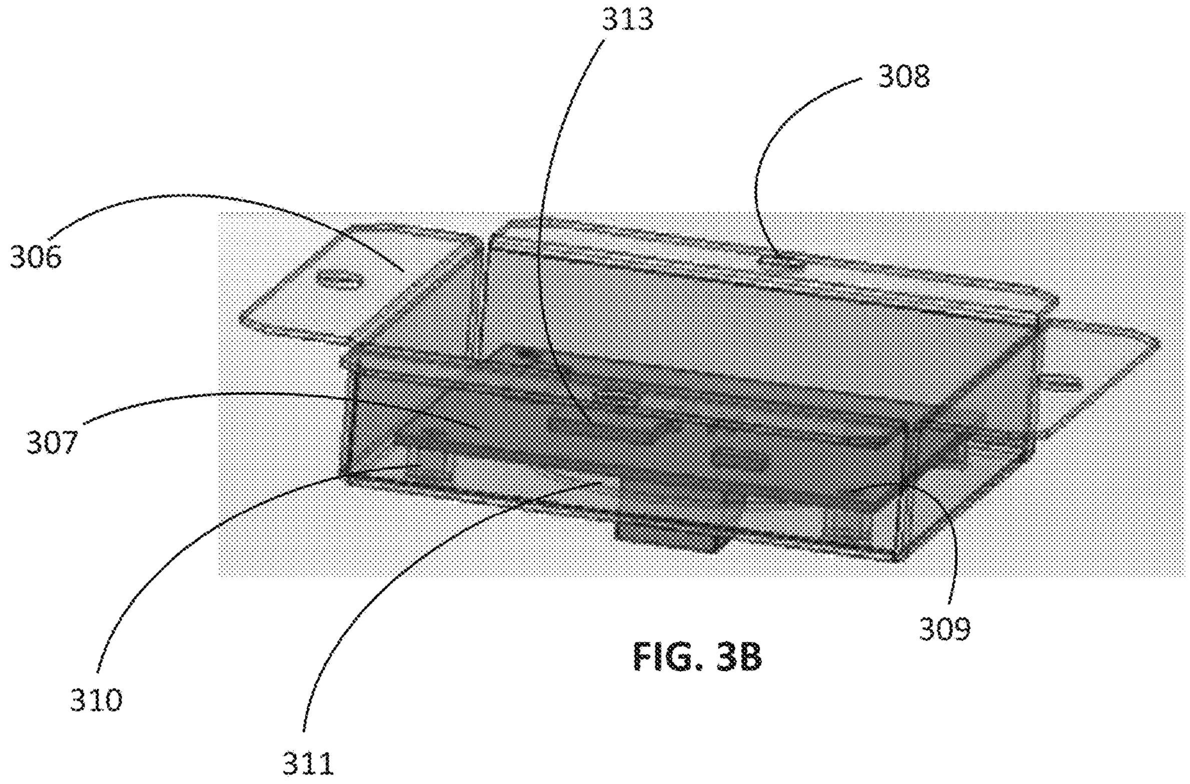
FIG. 3B is a side cross-sectional view of a lower bracket of the exemplary token sensor assembly in accordance with one or more embodiments.

Referring to FIG. 3B, lower bracket 306 may be fastened to the lower surface of the support structure 305 by way of screws through holes 308. Control PCB 307 may be mounted inside lower bracket 306 by way of screws inserted through holes 309 in the control PCB 307 and screwed into bosses 310 of the bottom bracket 306. A hole 311 in the bottom of lower bracket 306 allows a communications connector 312, for example, a CAT5 ethernet connector, to extend below the bottom of the lower bracket 306 for the purposes of communicatively coupling the token sensor assembly 300 to the game controller 170 of FIG. 1.

Figure 3C:
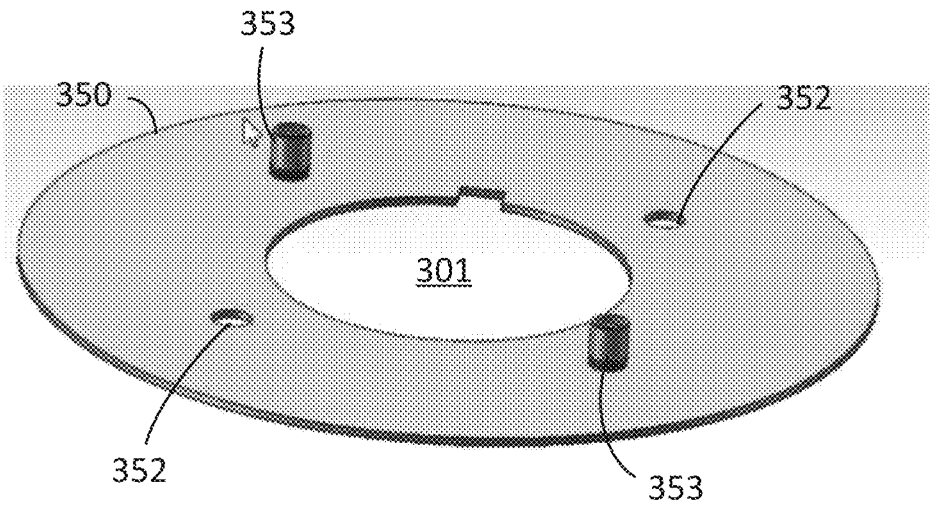
FIG. 3C is a top perspective view of a mount for securing the exemplary token sensor to the gaming table in accordance with one or more embodiments.

Referring now to FIG. 3C, the mount 350 is fashioned from sheet metal, but may be of any suitable material. The mount 350 may be attached to the upper surface of the gaming table support surface 305 by any means such as adhesive or via fasteners. For example, the mount 350 may be attached to the support surface 305 using wood screws thorough mounting holes 352. The mount may also include threaded standoffs 353 for receiving screws for the purpose of alignment and fastening of the puck assembly 303 to the mount 350, as will be described later.

FIGS. 4A-4E provide views of various components of the puck assembly 200:

Bezel 401 is typically a single injection molded piece that protects the components of the puck 203 from spillage and other contaminants from above the gaming table surface and shields the internal components of the puck 300 from view while allowing light to pass for token sensing purposes and bezel illumination purposes. Details of the bezel 401 will be discussed further below.

Display 402 is typically a round TFT color LCD display, one example of which is a TXW210006B0-CTP, a 2.1-inch diameter 480 pixel×480 pixel display manufactured/sold by Shenzhen Tianxianwei Technology Co., LTD. While the exemplar display is round, in accordance with other embodiments, rectangular displays mounted in a round frame may be used. In accordance with some embodiments, display 402 may include a touchscreen for the acceptance of game inputs by a user.

Ring PCB 403 includes a plurality of paired light radiation (e.g., visible light, IR radiation, and/or UV radiation) emitters and light radiation detectors. These emitters and detectors are analogous to the emitters 220 and detectors 240 described above with reference to FIG. 2. The ring PCB 403 further includes a number of upward facing red-green-blue (RGB) light emitting diodes (LEDs) which are visible through the upper surface of the bezel assembly 401. The emitters, detectors and LEDs will be discussed in more detail below with reference to FIG. 4E.

Display alignment guide 404 centers the display 402 in the puck assembly 400, especially with respect to the bezel 401. The display alignment guide 404 is mounted to the upper surface of the MCU PCB 405 using alignment bosses 413 inserted into holes 414 of the MCU PCB 405. The display alignment guide 404 may also have standoff bosses 415 extending up from the display alignment guide 404 to support the ring PCB 403 and the display 402.

MCU PCB 405 may be mounted to puck base 407 by way of screws through holes 411 into screw bosses 412. The MCU PCB 405 includes a PIC microcontroller (MCU) 417 mounted to the lower surface of the MCU PCB 405, as shown in FIG. 4B.

Referring back to FIG. 4A, once aligned by the display alignment guide 404, the display 402 may be mounted to the MCU PCB 405 using a double-sided adhesive pad 406 or by other adhesive means.

Figure 4A:
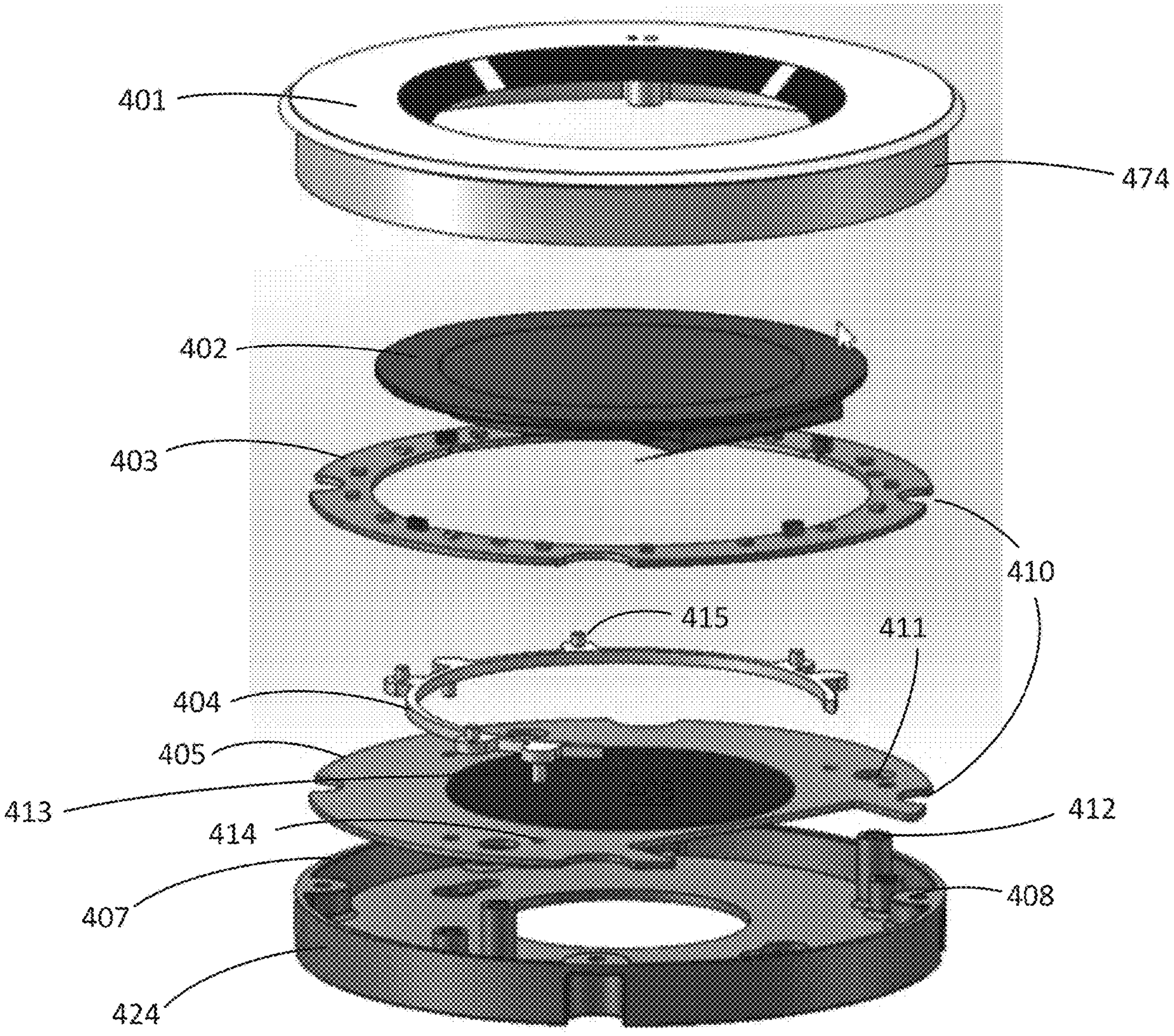
FIG. 4A is an exploded cross-sectional view of a puck assembly of the exemplary token sensor in accordance with one or more embodiments.
Figure 4B:
FIG. 4B is a bottom perspective view of a MCU printed circuit board of the puck assembly of FIG. 4A in accordance with one or more embodiments.

As FIG. 4A illustrates, the display 402, the ring PCB 403, and the MCU PCB 405 are effectively sandwiched between the bezel assembly 401 and the puck base 407 to form the puck assembly 400. Fasteners, such as screws, inserted through mounting holes in bosses 408 in the puck base 407 pass through slots 410 in the MCU PCB 405 and the ring PCB 403 and into screw bosses 411 (FIG. 4C)) on the underside of the bezel assembly 401.

The puck assembly 400 is preferably attachable and detachable from the mount 350 (FIG. 3C) without having to disconnect the mount 350 or the other token sensor components from the gaming table support surface 205 (FIG. 2). To achieve this purpose, the mount 350 includes threaded standoffs 353 (FIG. 3C) for receiving screws (not shown). The puck base 407 includes two keyholes 421 (FIG. 4D), the circular openings of which accept the heads of the screws threaded into the standoffs 353. Wiring from the electronic components below the gaming table support surface 205, for example, a ribbon cable, is attached to a connector (not shown) on the MCU PCB 405, then the puck assembly is placed above the mount 350 with the round holes in the keyholes 421 aligned with the screw heads. Once the screw heads have been inserted into the keyholes 421, the puck 200 assembly is rotated, for example, by fifteen degrees, to lock the screws into the channels of the keyholes 421 to attach the puck assembly 400 to the mount 350. The puck assembly 400 may be detached from the mount 300 by reversing this procedure. This allows a puck assembly 400 with a scratched or damaged bezel 401, damaged display 402 or malfunctioning electronics to be easily replaced.

Figure 4C:
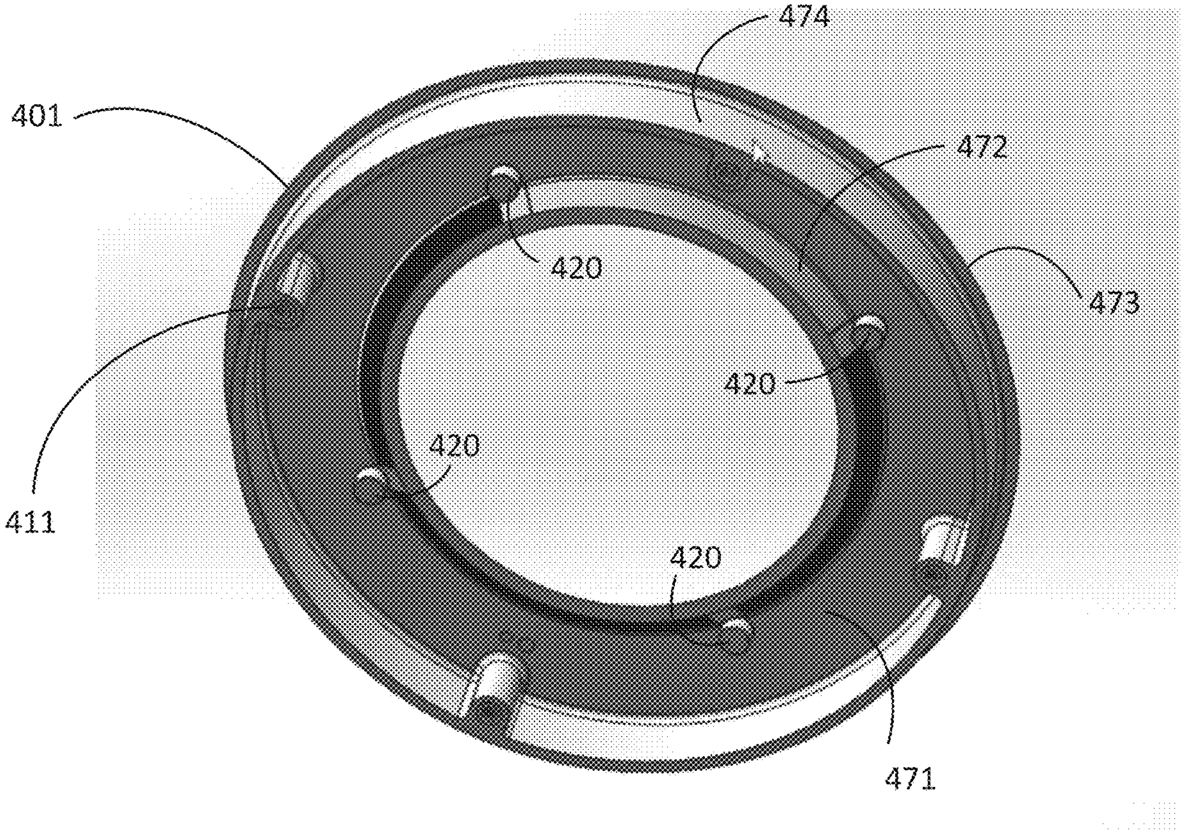
FIG. 4C is a bottom perspective view of a bezel of the puck assembly of FIG. 4A in accordance with one or more embodiments.
Figure 4D:
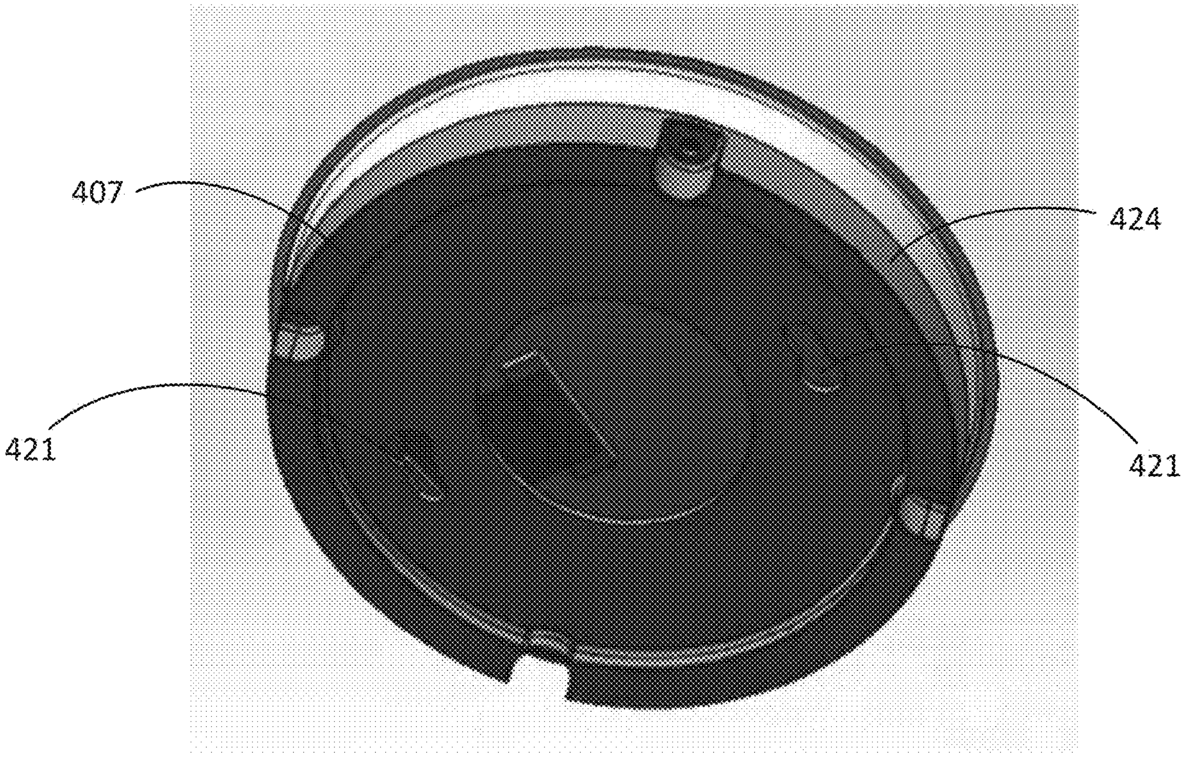
FIG. 4D is a bottom perspective view of a puck base of the puck assembly of FIG. 4A in accordance with one or more embodiments.
Figure 4E:
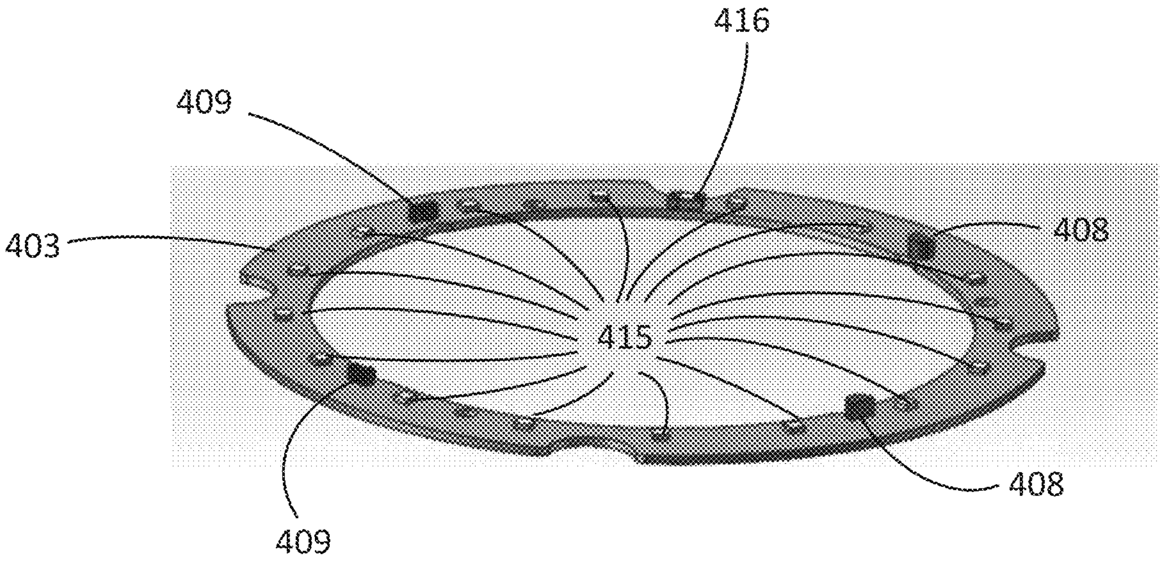
FIG. 4E is an upper perspective view of a ring printed circuit board of the puck assembly of FIG. 4A.

FIG. 4E further illustrates components of the Ring PCB 403. Light emitting diodes (LEDs) 415 project visible light up through the bezel 401 to provide feedback to the dealer and player. For example, the LEDs 415 may project green light when a token 260 has been detected on the token sensor 200 and the wager represented by the token 260 has been registered by the system. The token 260 may then by removed from the token sensor 200 while leaving the wager "locked in." In another example, the LEDs 415 may flash alternating colors during a wagering period in which a token 260 may be accepted by the system or may project red light in cases of an error condition. The LEDs are controlled by the ARM CPU 313 on the control PCB 307. The ARM CPU 313 will be discussed further below.

Continuing with FIG. 4E, light emitters 408 may be any electrically stimulated light-emitting device such as bulbs, LEDs, lasers and the like. It is preferred that these light sources have a narrow (less than 100 nm) range of emitted light, and preferably have a range of emitted light that is less than 50 nm, more preferably less than 25 nm and most preferably less than 10 nm in range of wavelengths. In accordance with the embodiments described herein, the emitters 408 preferably emit infrared (IR) light at 940 nm and the detectors 409 are optimized to sense that wavelength. Use of infrared light avoids the problem of prior art token sensors which typically transmit visible radiation, for example red light at approximately 730 nm. When such visible light is used, a translucent bezel is required to avoid any harsh, bright light passing around edges of a token or after a token has been removed, which harsh light might annoy players at the gaming table. Use of infrared light avoids these problems. A non-limiting example of a suitable IR emitter 408 is an Everlight EAISV3024A0, while a non-limiting example of a suitable IR detector is a photo diode such as a Vishay VEMD10949F. Alternately, a visible light blocking material such as: RTP 0300 in color S-806332, available from RTP Co, Winona, MN can be used.

False readings can be avoided by providing a filter placed between each light emitter 408 and its respective receiver 409 to block all light except the expected range of wavelengths to be sensed. In preferred embodiments, the filter may be incorporated into the receiver 409.

False readings may be further avoided, in some embodiments, but modulating the transmission of light from an emitter 408 to its respective receiver 409 such that it is sent in pulses at an uncommon frequency, that is different from those normally seen in ambient casino lighting, such as 60 Hz. Any light received by the receiver 409 when it is known that the associated emitter 408 is not emitting light, (i.e., light that is received off frequency) will be ignored. The operation of the light emitters 408 and receivers 409 is controlled by the MCU 417 on the MCU PCB 405. The operation of the MCU 417 will be discussed further below.

The ring PCB 403 optionally includes a gesture sensor 416, the purpose of which will be described further below. An example of a suitable gesture sensor 416 is a Broadcom APDS-9960.

The ring PCB 403 is electrically attached to the MCU PCB 405 by way of pins (not shown) on the ring PCB 403 inserted into a matching connector (not shown) on the MCU PCB. Alternately, a short ribbon cable may be attached to connectors on each of the ring PCB 403 and the MCU PCB 405.

Figure 4F:
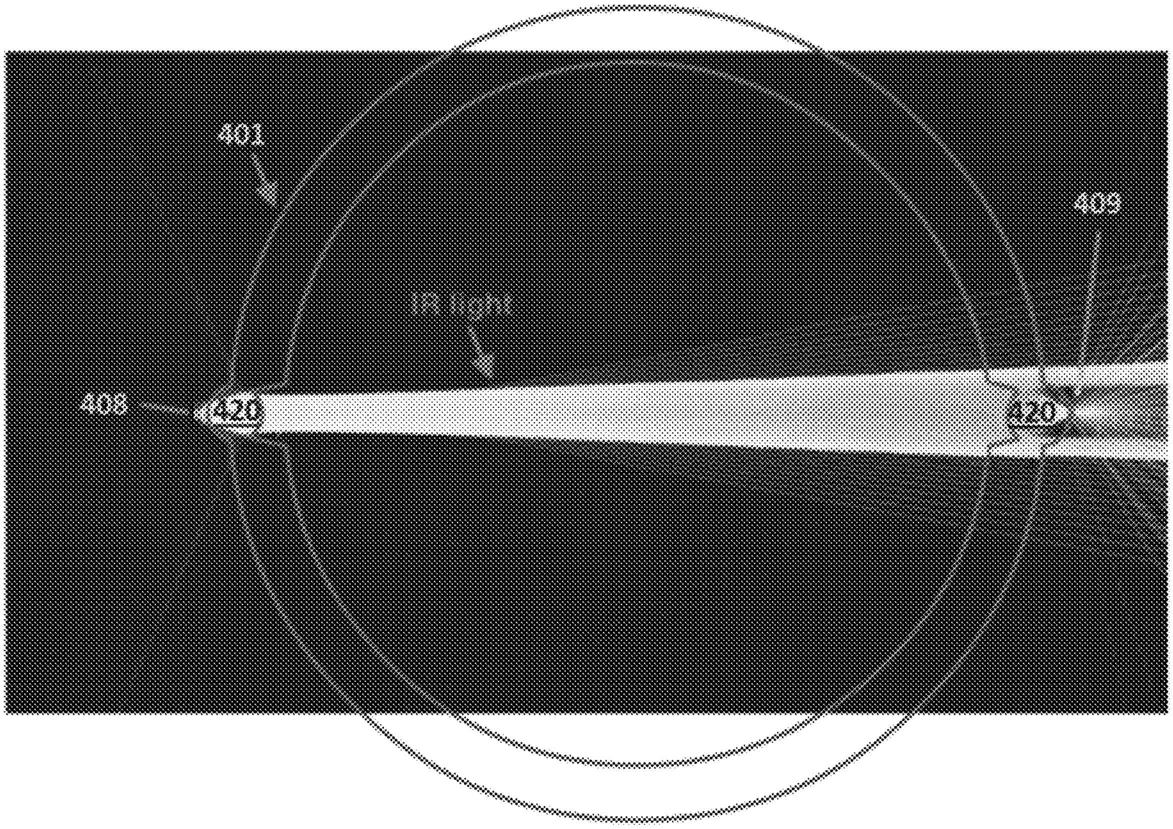
FIG. 4F is top view of the bezel of FIG. 4C illustrating the transmission of light through the bezel in accordance with one or more embodiments.

FIG. 4F is a top view of bezel 401 that illustrates light transmission features of the bezel 401. The bezel 401 may be molded from any light-transmitting material, such as glass or polymer, and especially polymeric materials which can be molded, formed and machined, such as polyesters (e.g., LEXAN® polyester), polycarbonates, polyolefins (especially polypropylene, polyethylene and mixtures thereof), thermoplastic polymers and cross-linked polymers.

IR light transmitted from each emitter 408 is focused into its associated detector 409 by opposing column lenses 420. FIG. 4C illustrates the locations of the column lenses 420 molded into the lower surface of the bezel 401. FIG. 4F generally illustrates how non-focused light from emitter 408 is somewhat narrowed by the column lens 420 molded into the bezel 401 adjacent to the emitter 408 and further narrowed by the column lens 420 molded into the bezel 401 adjacent to the detector 409.

Figure 4G:
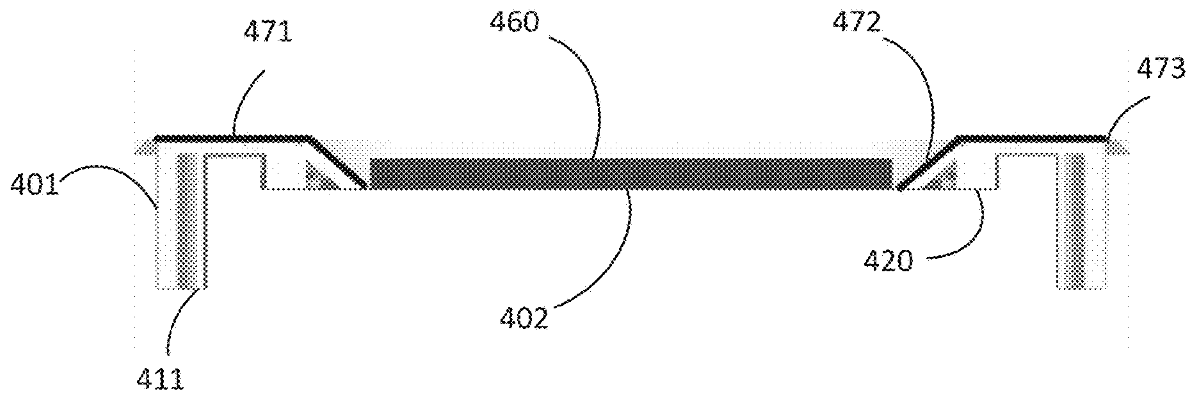
FIG. 4G is a side cross-sectional view of the bezel of FIGS. 4C and 4F in accordance with one or more embodiments.

FIG. 4G presents a cross section of the bezel 401. It may also be helpful to refer back to FIG. 4C, which shows a view of the lower surfaces of the bezel 401 in which the various components molded into the bezel are identified by like numbers.

The bezel 401 has an upper surface 471 through which the LEDs 415 on the ring PCB 403 may transmit visible light, as described above. The upper surface 471 has a diameter slightly larger than that of the puck base 407, providing a small lip 473 that rests on the top surface of the game layout 302 (FIG. 3). The bezel 401 includes a side wall 474 which, as illustrated in FIGS. 4A and 4C, forms an upper portion of the case of the puck assembly 400, the lower portion being formed by the side wall 424 of the puck base 407 (FIGS. 4A and 4D).

Referring again to FIG. 4G, the bezel 401 further includes a slant window 472. The purpose of the slant window 472 is to protect the components of the ring PCB 403 while allowing the emitters 408 to transmit IR light across the upper surface of the display 402 and to allow the detectors 409 to receive the transmitted IR light when not blocked by a token 460 (aka 260, FIG. 2B). The slant window 472 is slanted to provide a well to receive and center the token 460 and provides for easy removal of the token 460 from the well by, for example, placing finger pressure on the top of the token 460 and sliding the token 460 out of the well.

The cross section of FIG. 4G also shows the location of the screw bosses 411 used for the mounting of the puck base 407 to the bezel 401, as previously described above with reference to FIG. 4C.

If desired, color may be provided in the bezel 401 by dyes or pigments of the desired wavelengths. Embossing, engraving, etching and printing on the bezel 401 may be used to add translucency or opacity in certain areas. Translucency may also be provided by light-scattering particulates or bubbles in the composition of the bezel 401. For example, no treatments may be applied to sections of the slant window 472 adjacent to the column lenses 420 used for the transmission and reception of IR light. Portions of the slant window 472 not used for light transmission and reception may be made opaque to shield the internal components of the puck 200 from view. Finally, some or all of the upper surface 471 may be translucent so light from the LEDs 415 may be seen while still shielding the internal components of the puck 200 from view.

Figure 5:
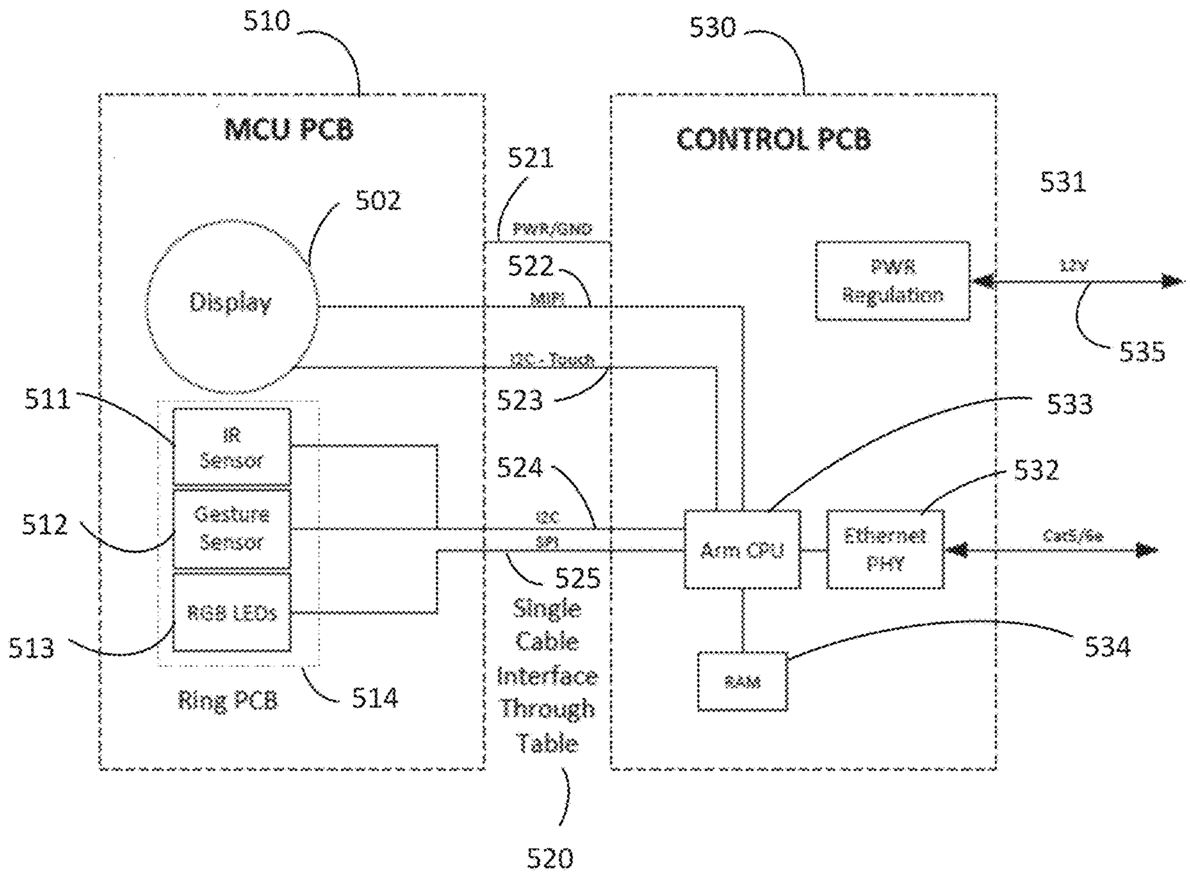
FIG. 5 is a block diagram of the exemplary token sensor controller illustrating the connections between major components in accordance with one or more embodiments.

FIG. 5, in accordance with one or more embodiments, provides a block diagram of electrical connections between the various components of the MCU PCB 510 and the components of the ring PCB 514 and the control PCB components 530.

A single cable 520 connects the MCU PCB components 510, contained in the puck 200 mounted above the gaming table support surface 305 (FIG. 3A) and the control PCB components 530 contained in the lower bracket 306 (FIG. 3B) through a hole in the gaming table surface 305. A non-limiting example of a suitable cable would be a ribbon cable with 2×10 connectors. The cable 520 contains power and ground connections 521 between the MCU PCB components 510 and the control PCB components 530, with power originating from a power regulator 531 on the control PCB 530, driven by external **12*v* power 535**.

The cable 520 further includes an MIPI DSI video display interface between the ARM CPU 533 and the display 502 that carries data for controlling text and images on the screen of the display 502. In embodiments that include a touchscreen as part of the display 502, an I2C connection 523 carries touch data to the ARM CPU 533. The infrared sensor section 511, which includes the emitters 408, detectors 409 and the gesture sensor 416 (FIG. 4E) of the ring PCB components 514, sends and receives data to and from the ARM CPU 533 via a second I2C connection 524. An SPI connection 525 between the ARM CPU 533 and the RGB LEDs 513 completes the signals carried by the cable 520.

Figure 6:
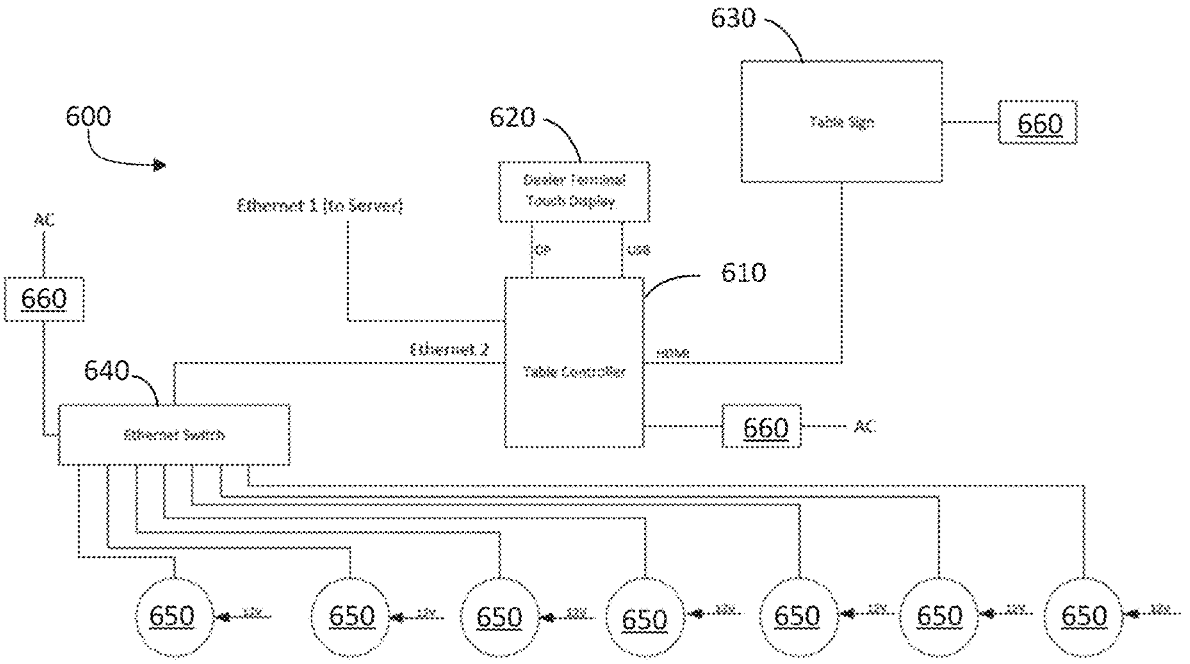
FIG. 6 is a block diagram of a gaming table illustrating the connections between major components in accordance with one or more embodiments.

FIG. 6, in accordance with one or more embodiments, provides a block diagram of connections between various components for a gaming table 600 similar to the gaming table 102 described above with reference to FIG. 1. Table controller 610, which may be, for example, a Nexus Command II Table Controller manufactured and sold by Light and Wonder, Inc., is connected via USB and DisplayPort connections to a dealer terminal 620, which for example, may include an LCD display panel with a touchscreen input, one or more separate buttons, etc. The table controller 610 is also connected to a table sign 630 via an HDMI cable. The table sign 630 is typically a video display monitor used to graphically display game title, wagering limits, progressive award information, bonus game displays, animations and the like. The HDMI cable to the table sign 630 may also include audio content playable through audio components, such as an amplifier and speakers, of the table sign 630. The table controller 610 is also connected via a first ethernet connection to a remote central game/progressive server, for example, the GM Atlas system mentioned above. A second ethernet connection communicatively couples the table controller 610 to an ethernet switch 640. The ethernet switch 640 serves as a centralized connection point for the token sensors 650 and provides a communication link between the table controller 610 and the token sensors 650. The table controller 610, the dealer terminal 620, the table sign 630 and the ethernet switch 640 are typically powered by alternating current power supply units 650. The token sensors are typically powered by 12 vdc supplied by a direct current power distribution hub (not shown) also connected to a power supply unit 650.

Figure 7A:
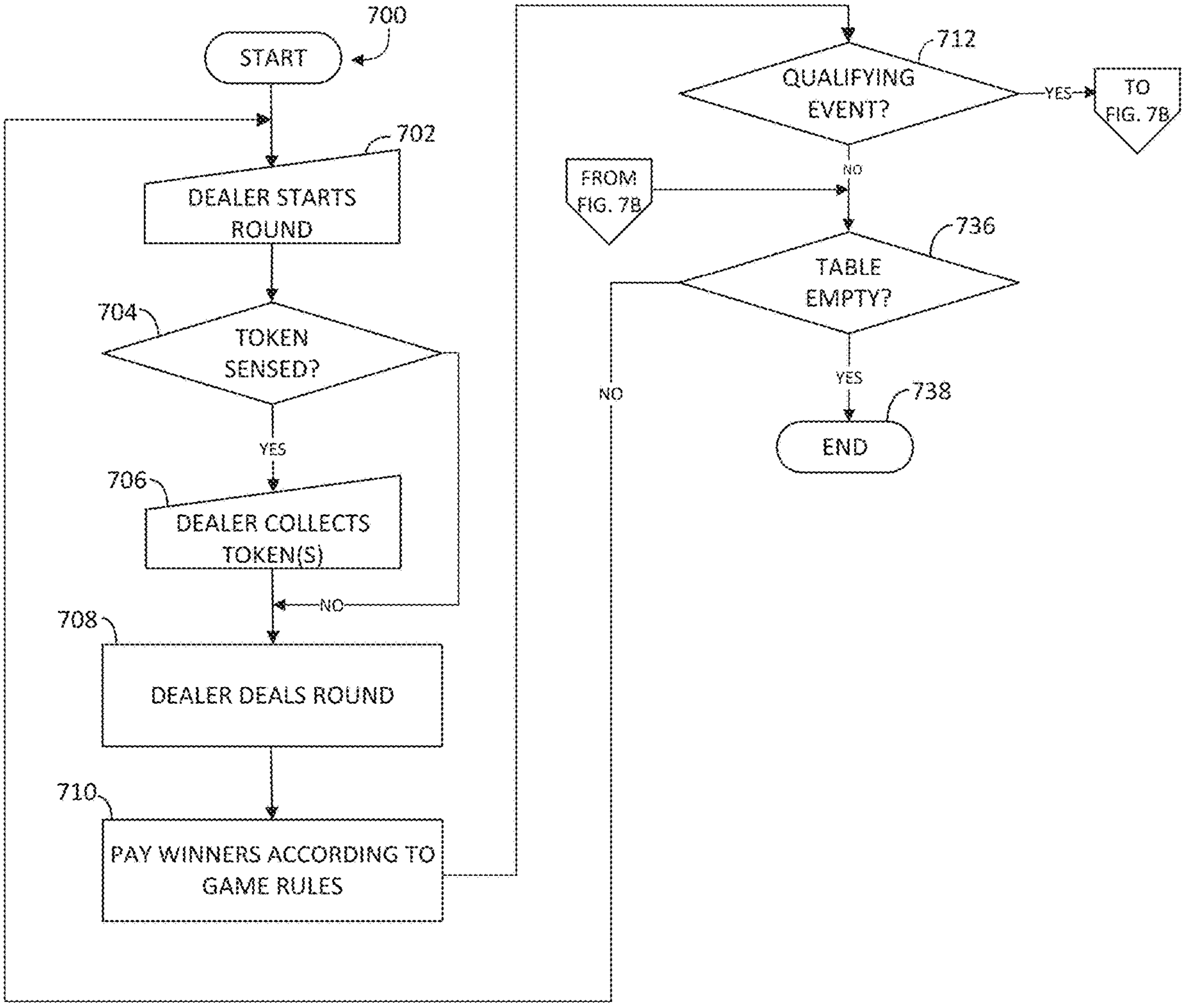
FIGS. 7A and 7B are a process flow chart for an exemplary use case method using the components of FIG. 6 in accordance with one or more embodiments.
Figure 7B:
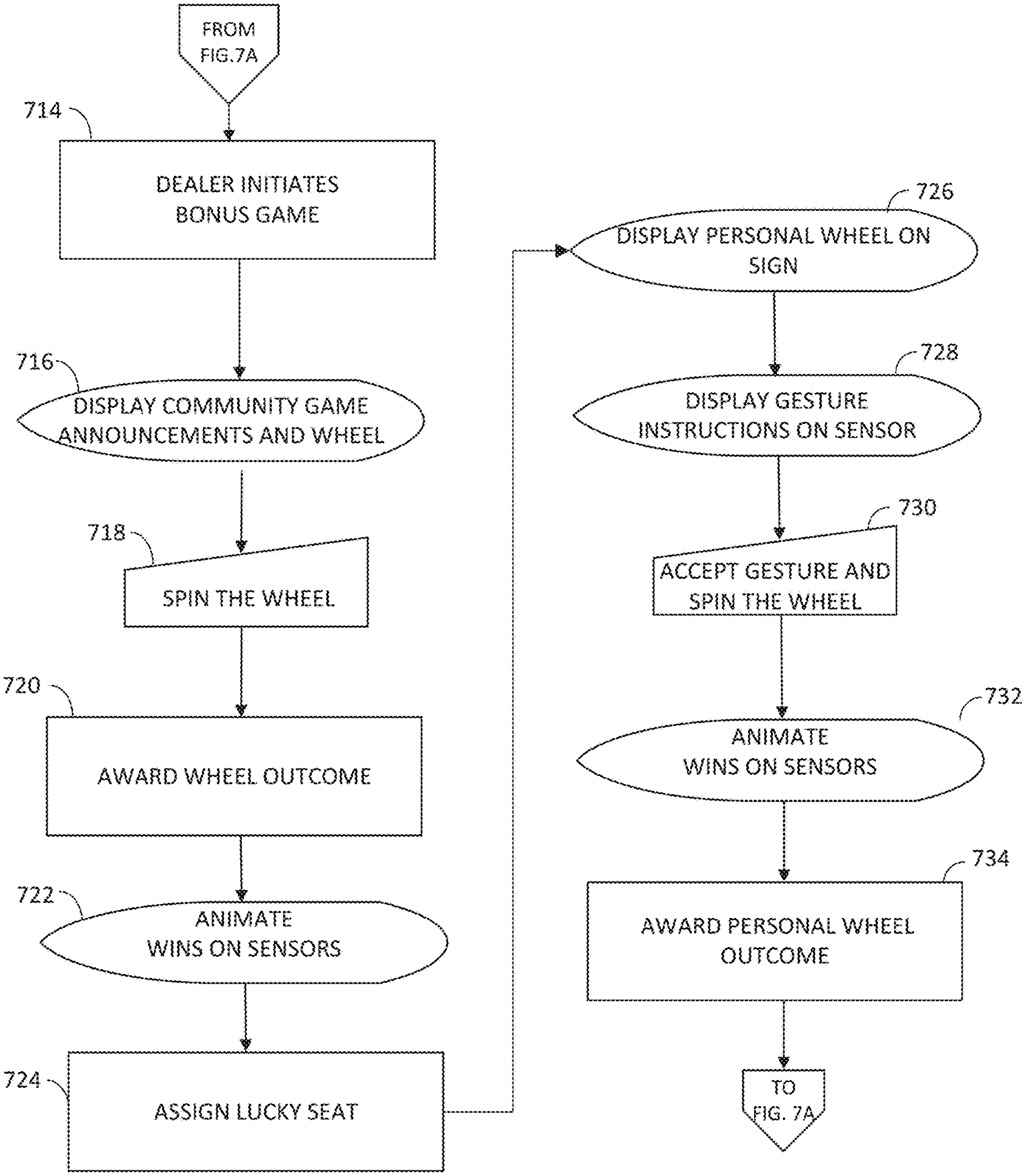

Referring now to FIGS. 7A-7B, there is shown a flow diagram representing one data processing method 700 corresponding to at least some instructions stored and executed by the table controller 610 of FIG. 6 to perform operations of an exemplar use case of the present invention. The data processing method 700 relates to a table game including a community bonus game and a secondary personal bonus game. Various elements of FIG. 6 will be referenced in the description of FIGS. 7A-7B.

At step 702, the dealer starts a game round. The dealer may enter a command on the dealer terminal touch display 620 to indicate to the table controller 610 that the game round has begun. In response, the table controller 610 may announce the start of the game round on the table sign 660 and on each of the displays of the token sensors 650. For example, the token sensor displays may display instructions for placing a bonus game wager: “Place a token here for a chance to win $30,286.50!” Optionally, a countdown timer indicating how long the bonus game wagering period will be in effect may be displayed. The token sensors 650 may also be commanded to flash their upward facing LEDs in a particular color, for example, green. Each token sensor receiving a token on its surface will transmit that information to the table controller 610, which may then command the token sensor to change the color of the LEDs to acknowledge the presence of the token, for example, to orange. At the conclusion of the wagering period, the table controller may display, "No More Bets" on the displays of the token sensors 650 and change the color of their LEDs to red.

At step 704, if no bonus game wagers were placed, the flow continues to step 708. Otherwise, one or more tokens have been sensed on the token sensors 650 and, at step 706, the tokens are collected from the token sensors 650 by the dealer into the chip tray 140 (FIG. 1). The table controller 610 monitors the token sensors 650 for removal of the tokens and "locks in" the bonus game wager for each respective table position as its token is removed. The table controller 610 may turn the token sensor LEDs at "locked in" table positions to green and those without a bonus game wager to another color or to off. The table controller 610 notifies the server of each locked in bonus game wager for the purposes of incrementing the progressive award.

At step 708, the dealer deals the game round, for example, by removing and distributing cards from the card handling device 180 (FIG. 1) according to the rules of the game being played.

At step 710, the dealer pays any winning hands according to the game rules for the game being played.

At step 712, the dealer indicates whether the dealt cards represent a qualifying event for the triggering of a bonus game. For example, in a game of blackjack, the qualifying event may be that the dealer has a blackjack.

Depending on the game being played at the gaming table, any combination, or lack thereof, of dealer and/or player cards may be specified as a qualifying event. In accordance with some embodiments, the table controller may simply, once the tokens have been collected at step 704, randomly determine that a bonus game will be played. Thus, approximately the same odds of a qualifying event may exist at gaming tables with different game rules. By specifying the same probability of a qualifying event, whether determined by the dealt cards or by the table controller 610, common progressive awards may be shared by dissimilar games.

If there is no qualifying event at step 712, the game round is over and flow proceeds to step 736. However, if there is a qualifying event at step 712, flow proceeds to step 714 of FIG. 7B.

At step 714, the dealer starts the bonus game. As in step 702, the dealer may enter a command on the dealer terminal touch display 620 to indicate to the table controller 610 that the bonus game has begun.

At step 716, in response, the table controller 610 may announce the start of the bonus game on the table sign 660. Each token sensor with a wager locked in at step 704 may display "You are entered in the Community Bonus Game!" and be commanded to flash their upward facing LEDs in a particular color, for example, white. Each token sensor at a position where a wager was not locked in may alternately display a different message, for example, "Not Eligible for the Community Bonus Game", with the LEDs off.

In this example, the bonus game includes a prize wheel which is also displayed on the table sign 660 at step 716.

At step 718, the dealer initiates an animated spin of the displayed bonus wheel by entering a command on the dealer terminal touch display 620. The wheel displayed on the table sign 660 is then animated to produce a randomly selected, via a random number generator in the table controller 610, a prize amount from amounts displayed on the wheel.

The winning amount is displayed on the display of each of the token sensors at the participating seats at step 720. The token sensor LEDs may also be commanded to flash in celebration.

At step 722, the randomly selected wheel outcome is paid to all seats participating in the bonus game.

At step 724, the table controller 610 randomly determines a "lucky seat" from the positions at the gaming table with locked in bonus game wagers. The lucky seat position may be displayed on the table sign 660.

At step 726, the bonus wheel on the table sign 610 may be repopulated and displayed as a "personal wheel" with different prize values for the personal round of the bonus game. In some embodiments, the values may stay the same. In preferred embodiments, the personal wheel values include one or more progressive awards.

At step 728, the game controller 610 also displays instructions on the display of the token sensor at the lucky seat table position. For example, a message such as "You Have the Lucky Seat! Press Here to Spin the Wheel!" may be displayed. Again, the LCDs may also be animated, for example, by changing colors or flashing. The instructions may instruct the player to perform a more complex gesture or touch detectable by the token sensor using the gesture sensor, the touch zones determined by the emitters/detectors or the optional touchscreen, as described above. For example, the player may be asked to run their finger around the inner wall of the well of the token sensor to simulate a spinning motion.

At step 730, the system waits for the player to make the instructed gesture. The token sensor determines when the required gesture has been made and sends this information to the table controller 610, which accepts the gesture. A spin of the personal wheel is then animated on the table sign 660. In some embodiments, the personal wheel may also be displayed and animated on the token sensor display at the lucky seat.

At step 732, the amount of the randomly determined personal prize is displayed on the table sign 660 and on the display of the token sensor at the lucky seat. The token sensor LEDs may be commanded flash in celebration.

At step 734, the dealer pays the player at the lucky seat according to the randomly selected personal wheel outcome. Flow then returns to step 736 of FIG. 7A.

At step 736, if at least one player remains at the table, the flow continues to step 702, where the dealer starts another game round as described above. If no players remain at the table, the method concludes at step 738.

In this description, numerous specific details are set forth. However, it is understood that embodiments of the invention may be practiced without these specific details. Although specific ranges, specific compositions, and specific components have been identified to enable preferred practice of the present technology, one skilled in the art, reading the specification and viewing the figures, understands the generic concepts disclosed herein. This understanding enables the use of alternatives and options and design changes within the skill of the ordinary artisan in the electronics and imaging field, without undue experimentation and within the scope of the claims.

For example, while the above exemplar use case includes a bonus wheel displayed on the table sign 660, a mechanically wheel operated by a stepper motor may be connected to the table controller 610 and used in cases where the community prizes and the personal prizes are the same. In some embodiments, a separate video display other than the table sign 660 connected to the table controller 610 may portray the bonus wheels. The use of a wheel is only an example. In other embodiments, any means of determining the community and personal bonus game awards falls within the spirit and scope of the invention.

In a further example, while the above disclosed planar token detection scheme is described as transmitting light above the top surface of the token sensor, other embodiments transmit the light through a top surface "glass" installed over the display and on which the token is placed. With this alternate method, there is no slanted window bezel including focusing lenses mounted above the surface of the display as described above. Rather, one or more light beams are guided within the cover glass itself and the cover glass becomes the waveguide medium between the emitters and detectors. If the cover surface is glass, for example, it has an index of refraction of ~1.5. The surrounding air has a refraction index of 1. This difference causes total internal reflection for light emitted at approximately 42 degrees from normal. When a token is placed on the surface, this critical angle changes and, thus, the amount of light guided within the cover glass also changes. A determination of token presence or absence can then be based on the amount of light received at the detector.

In accordance with some embodiments, the upper surface of the token sensor is not circular. For example, the planar token detection techniques described above are equally applicable to square or rectangularly shaped upper surfaces of the token sensor. All that is required is that paired emitters and detectors are positioned such that light transmitted by the emitters is blocked their respective detectors when a token is placed on the upper surface of the token sensor. Similarly, while a circular display has been disclosed, a rectangular or square display matching the shape of the upper surface of the token may be particularly suitable. Any combination of upper surface shape and display shape falls within the spirit and scope of the invention.

In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A token sensor mountable to an upper surface of a gaming table and communicatively coupled to an electronic table controller of the gaming table, the token sensor comprising:

a top surface;

logic circuitry comprising one or more processors;

at least one light emitter paired with a light detector, the at least one light emitter positioned to transmit light above and across the top surface to its paired light detector, the at least one light emitter and its paired light detector positioned such that light transmitted by the at least one light emitter is detectable by its paired light detector; and one or more focusing lenses disposed between the at least one light emitter and its paired light detector, the one or more focusing lenses being integrated into a bezel mounted above a level of the top surface and around a periphery of the top surface;

wherein, via the logic circuitry, the token sensor communicates to the electronic table controller an indication of a presence of a token on the top surface when the light transmitted by the at least one light emitter is blocked by the token from being detected by its paired light detector.

2. The token sensor of claim 1, wherein the light transmitted by the at least one light emitter comprises infrared light.

3. The token sensor of claim 1, further comprising a plurality of upward facing visible light emitters mounted below the bezel.

4. The token sensor of claim 1, wherein the top surface comprises an electronic display device.

5. The token sensor of claim 4, wherein the electronic display device displays text or graphics related to a game played at the gaming table.

6. The token sensor of claim 5, wherein the text or graphics include attract animations, celebratory animations, or instructions to a player of the game played at the gaming table.

7. The token sensor of claim 6, further comprising a gesture sensor for providing input to the electronic table controller.

8. The token sensor of claim 1, wherein the electronic table controller is communicatively coupled to a remote progressive controller system and wherein the presence of a token on the token sensor provides input to the progressive controller system.

9. A method of detecting a token placed on a token sensor mounted to an upper surface of a gaming table, the token sensor communicatively coupled to an electronic table controller of the gaming table, the token sensor including a top surface, logic circuitry, and at least one light emitter paired with a light detector, the logic circuitry comprising one or more processors, the at least one light emitter positioned to transmit light above and across the top surface of the token sensor to its respective light detector, the at least one light emitter and its paired light detector positioned such that light transmitted by the at least one light emitter is detectable by its respective paired light detector, the token sensor further including one or more focusing lenses disposed between the at least one light emitter and its paired light detector, the one or more focusing lenses being integrated into a bezel mounted above a level of the top surface and around a periphery of the top surface, the method comprising:

transmitting light from the at least one light emitter; and communicating to the electronic table controller, via the logic circuitry, an indication of a presence of the token on the top surface when the light transmitted by the at least one light emitter is blocked by the token from being detected by its paired light detector.

10. The method of claim 9, wherein the light transmitted by the at least one light emitter comprises infrared light.

11. The method of claim 9, wherein the token sensor further comprises a plurality of upward facing visible light emitters mounted below the bezel.

12. The method of claim 9, wherein the top surface comprises an electronic display device.

13. The method of claim 12, further comprising the step of displaying text or graphics related to a game played at the gaming table on the electronic display device.

14. The method of claim 13, wherein the text or graphics include attract animations, celebratory animations, or instructions to a player of the game played at the gaming table.

15. The method of claim 14, wherein the token sensor further comprises a gesture sensor for providing input to the electronic table controller.

16. The method of claim 9, wherein the electronic table controller is communicatively coupled to a remote progressive controller system and further comprising the step of transmitting the indication of the presence of the token on the token sensor to the progressive controller system.

* * * * *